United States Patent [19]
Haanen

[11] 3,806,733
[45] Apr. 23, 1974

[54] WIND OPERATED POWER GENERATING APPARATUS

[76] Inventor: Martin I. Haanen, 1854 E. 34th St., Minneapolis, Minn. 55407

[22] Filed: Mar. 22, 1973

[21] Appl. No.: 343,832

[52] U.S. Cl. .............................. 290/5 S, 290/44
[51] Int. Cl. ............................................ F03d 9/00
[58] Field of Search .............. 290/44, 55, 1, 43, 54; 415/DIG. 2

[56] References Cited
UNITED STATES PATENTS

| | | | |
|---|---|---|---|
| 2,230,526 | 2/1941 | Clayton | 290/55 |
| 3,194,008 | 7/1965 | Baungarten | 415/DIG. 2 |
| 2,523,192 | 8/1970 | Lang | 290/54 |
| 903,935 | 11/1908 | Wilson | 290/55 X |
| 2,037,973 | 4/1936 | Grondahl | 415/DIG. 2 |
| 1,708,807 | 4/1929 | Tatay | 415/DIG. 2 |

FOREIGN PATENTS OR APPLICATIONS

| | | | |
|---|---|---|---|
| 135,229 | 11/1919 | Great Britain | 415/DIG. 2 |
| 1,330 | 5/1857 | Great Britain | 415/DIG. 2 |
| 515,291 | 11/1920 | France | 415/DIG. 2 |

Primary Examiner—G. R. Simmons
Attorney, Agent, or Firm—Leo Gregory

[57] ABSTRACT

A wind operated electric power generating apparatus providing a pressurized supply of air to inflate air cells carried by an endless belt, said air cells rising in a tank of fluid to drive said belt, said belt operating an electric current generator.

5 Claims, 4 Drawing Figures

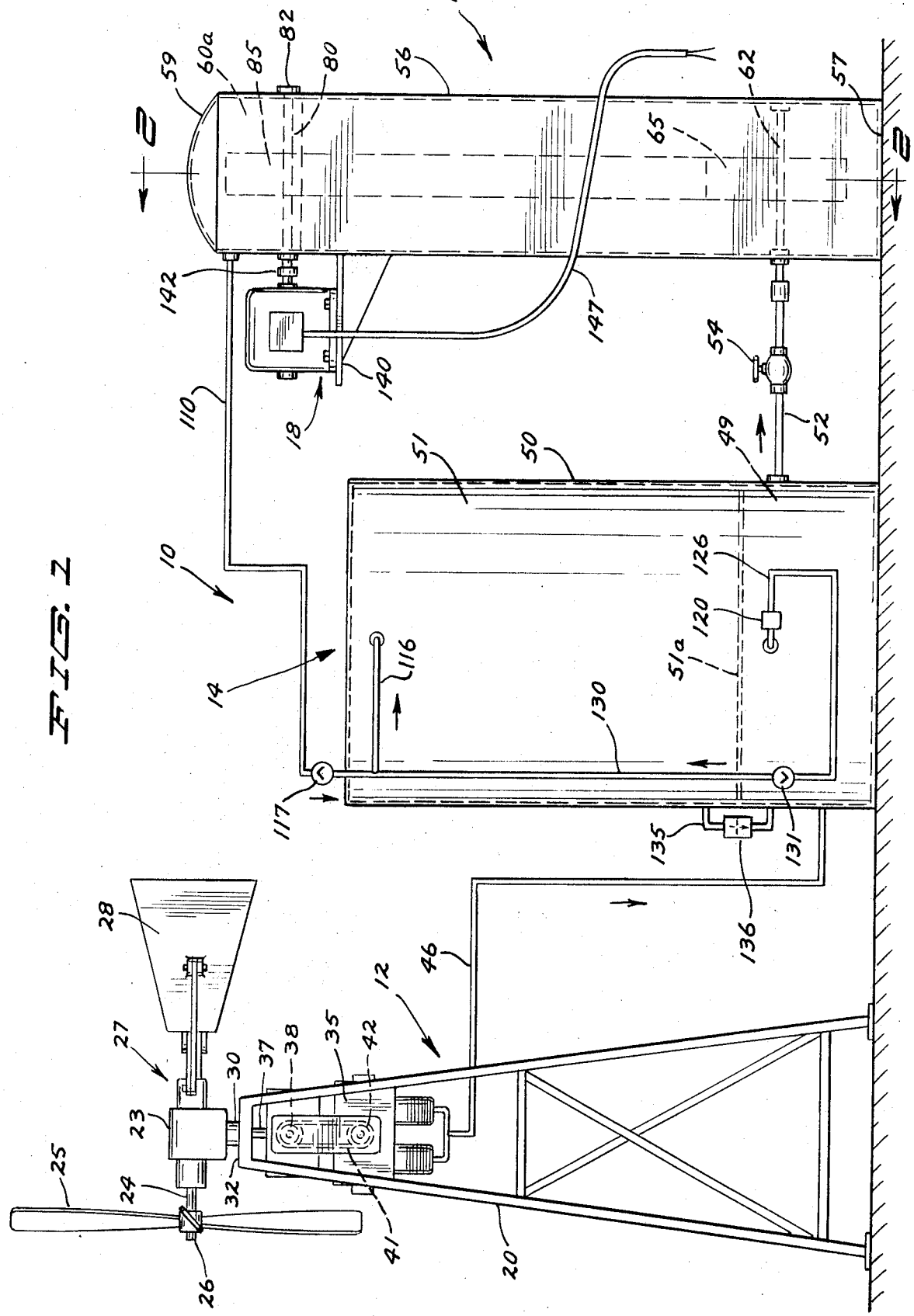

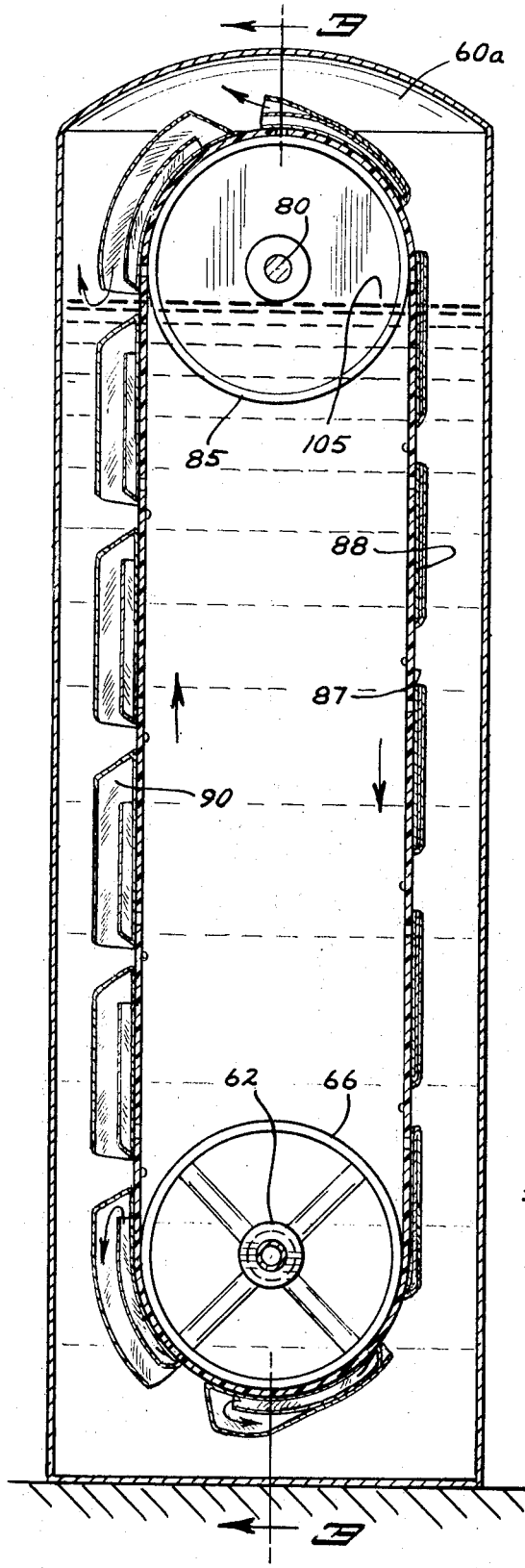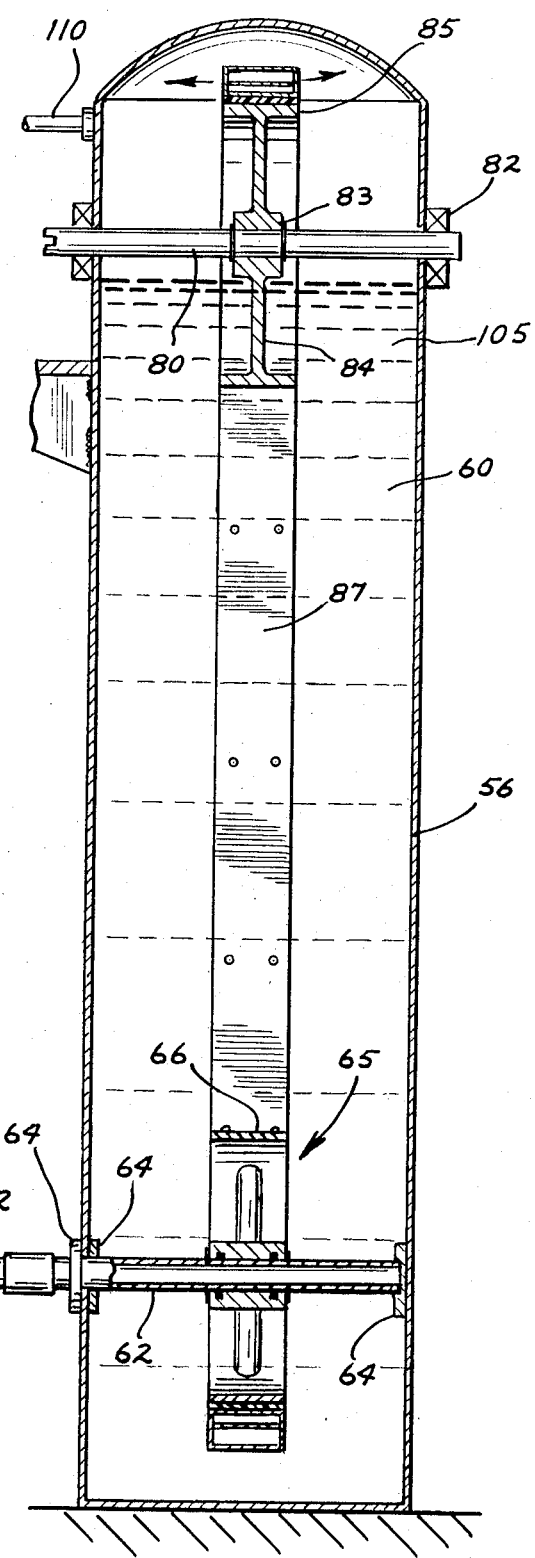

WIND OPERATED POWER GENERATING APPARATUS

BACKGROUND AND SUMMARY OF THE INVENTION

The invention herein relates to an apparatus arranged and constructed to utilize natural movement of air in operating an electric current generating apparatus.

In view of widespread concern regarding an energy crisis and the concern regarding pollution from the use of combustible energy producing materials, this invention discloses a concept and apparatus for utilizing a non-polluting natural source of energy to generate electric current.

It will be appreciated that in some areas of the United States there are fairly steady winds prevailing and such winds together with a reservoir of pressurized air would serve to generate a steady output of electric current.

It is an object of the invention therefore to provide an electric power generating apparatus which utilizes wind power for its operation.

It is another object of the invention herein to provide a member to be wind driven which will operate an air compressor providing a supply of pressurized air to inflate air cells which in turn are attached to an endless belt and which serve to drive said belt by rising in a tank of fluid, said belt operating an electric current generator.

It is a further object to provide an apparatus as set forth in the preceding object to provide a reservoir of pressurized air.

These and other objects and advantages of the invention will be set forth in the following description made in connection with the accompanying drawings in which like reference characters refer to similar parts throughout the several views and in which:

FIG. 1 is a view in elevation showing the apparatus comprising the invention herein;

FIG. 2 is a view in vertical section taken on line 2—2 of FIG. 1 as indicated;

FIG. 3 is a view in vertical section taken on line 3—3 of FIG. 2 as indicated.

DESCRIPTION OF A PREFERRED EMBODIMENT

Figure 4:
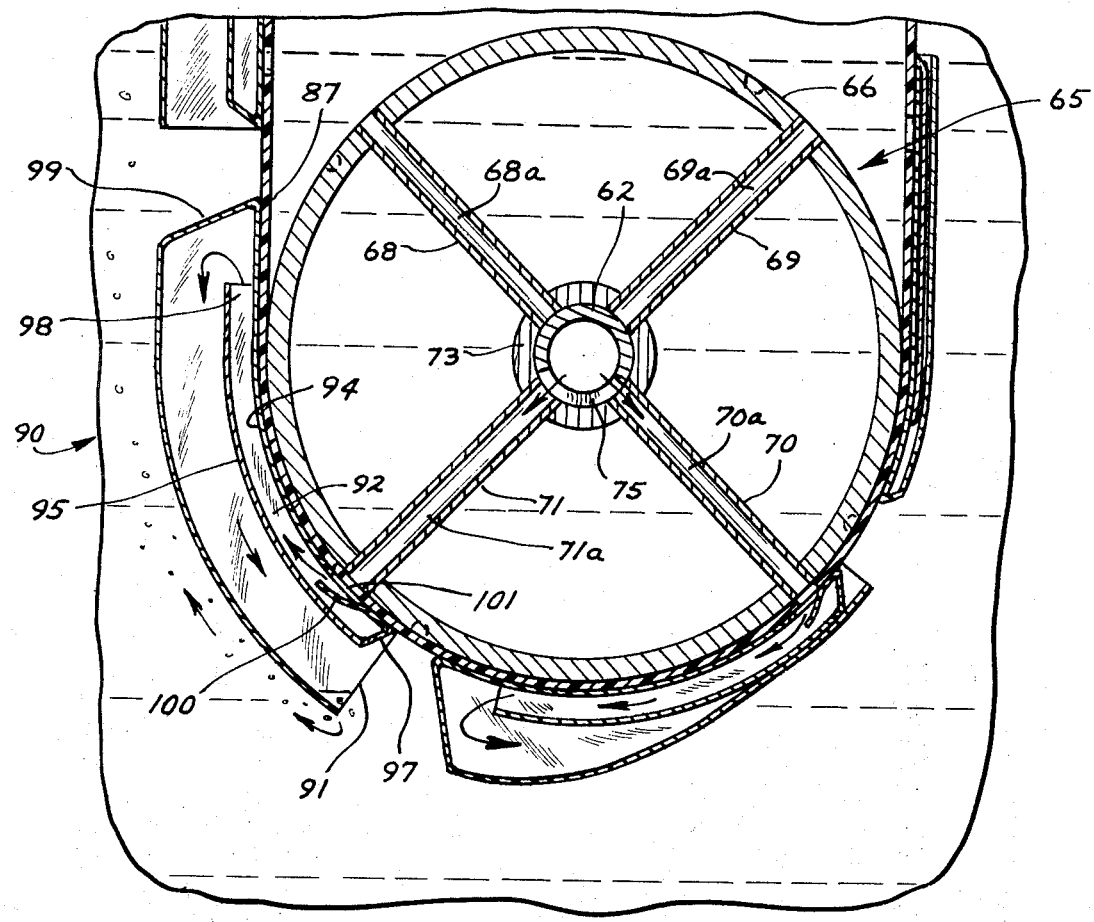
FIG. 4 is a broken view in vertical section showing a detail of structure on an enlarged scale.

Referring to FIG. 1, the apparatus comprising the invention herein is indicated generally by the reference numeral 10. Said apparatus includes generally a wind actuated tower supported member 12, a pressurized air reservoir and supply tank 14, an operating tank 16 and an electric current generating member 18.

The wind actuated member 12 in the embodiment of the invention here described consists of a tapered framework tower 20 made of conventional structure members and mounted thereon is a gear reduction box 23 having a shaft 24 extending therefrom having a plurality of blades 25 attached to a hub 26 mounted thereon forming a windmill 27 and extending rearwardly of said gear box 23 is a vertically disposed vane 28 to keep the blades 25 into the wind. Said gear box 23 is rotatably supported on a base member 30 which is carried on the upper plate member 32 of said tower. The specific assembly herein is all within skills known in the art.

Mounted within the upper portion of said tower by appropriate supporting members is an air compressor 35 of conventional design driven and operated by the shaft 37 driven from said gear box 23 and being operatively connected to a pulley 38 driven thereby and having a belt 41 pass thereon and over a pulley 42 which operates said compressor in a known manner. It will be understood that the specific driving connection between said gear box and said compressor may be otherwise arranged.

A line 46 conducts air under pressure from said compressor to a supply chamber 49 formed in a tank 50. A supply line 52 runs from said supply chamber 49 to said operating tank 16 as will be described.

Intermediate said supply line 52 is a pressure regulator valve 54 which will be set to pass air pressurized to a working level and for purposes of example such as being on the order of 40 psi.

Said tank 16 is shown here comprising a cylindrical housing 56 having a bottom wall 57, a domed top 59 and a chamber 60 therein.

Referring to FIG. 3, said tank 16 is shown in vertical cross section and extending thereacross adjacent the bottom portion thereof is a hollow or tubular shaft 62 supported by brackets or fittings 64 and by means of which it is connected to said supply line 52 through said tank to form a continuation of said supply line.

Rotatably mounted on said shaft 62 is a spoked wheel 65. Said wheel is shown having a flange rim 66 having tubular or hollow spokes 68–71 extending therethrough from a hub 73. Said spokes respectively have passages 68a–71a passing therethrough. It will be noted that said spokes extend through said hub and said rim. Said shaft 62 within said hub 73 has a sector like opening 75 therein at the lower portion thereof for an extent that would represent movement of a spoke through approximately 45° as illustrated in FIG. 4.

Mounted in the upper portion of said tank 56 in vertical alignment with said shaft 62 is a solid shaft 80 secured by what are here shown as external fittings 82. Mounted onto said shaft in driving engagement therewith is a wheel 85 not unlike said wheel 65 but having a solid hub 83 and solid spokes 84 as indicated. Passing over said wheels 65 and 85 is an endless belt 87. Said belt drives said wheel 85 and said shaft 80.

Said belt may be variously designed and very suitably may be in the form of a flat composition belt. Carried by said belt secured to the outer surface 87 thereof as by a suitable adhesive 88 are air cells 90 forming flexible inflatable bags such as of suitable plastic material. Said air cells in operating position are shown in FIG. 2. More specifically reference is had to FIG. 4 for enlarged detail of said air cell and related structure.

One air cell 90 will be described as representative of all the air cells and the same is formed as an elongated bag having an open bottom 91 and having therein a tubular passage 92 having a common outer wall 94 with said air cell and having an enclosing inner wall 95 forming a tubular passage closed at its end 97 adjacent the open bottom end 91 of said air cell and open at its end 98 adjacent the closed end 99 of said air cell. Said passage 92 adjacent its closed end 97 has a flap valve opening 100 which yields to pressure of air through the a spoke passage such as passage 71a through which air under pressure will pass into said passage 92. Said air cell 90 is mounted onto said belt 87 to have its flap valve opening 100 in register with a corresponding opening 101 in said belt.

Said belt 87 is mounted onto said wheels 85 and 65 that in passing over the lower rim of said wheel 65 as shown in FIG. 4, the flap valve 100 and corresponding belt opening 101 will be in register with a spoke passage shown in connection with 70a and 71a.

Said tank 56 has its chamber 60 filled with a fluid 105 here indicated as being water with said water filling said tank to a height or level substantially at the height of said shaft 80.

As will be further described, air is released from said air cells 90 into the upper chamber portion 60a which is above the level of the water in said chamber 60.

An air line 110 runs from said chamber portion 60a through air line 116 into the reserve air supply chamber or air reservoir chamber 51 of said tank 50 which reservoir is separated from the supply chamber 49 by a wall 51a. Said line 110 has a conventional one way air valve 117 therein.

The air pressure in the supply chamber 49 will be maintained at a desired operating pressure. When the pressure of air in chamber 49 rises above such a pressure, the air regulating valve 120 will be set to pass air above this pressure through the line 126 and same the one way valve 131 to the line 116 and into the reservoir chamber 51.

A line 135 runs from reservoir chamber 51 into the supply chamber 49. The passage of air through the line 135 is controlled by a conventional air pressure regulator valve 136 which will pass air when pressurized air supply in the supply tank 49 falls below the predetermined desired operating level.

Suitably mounted on a supporting bracket 140 as at one side of the tank 56 is said electric power generator 18 which is operated by the drive shaft 80 which will be suitably coupled thereto as at 142. A power supply line 147 is shown running from generator 18.

OPERATION

The invention herein is intended for operation within an area which has substantial and rather steady prevailing winds sufficient to operate the windmill. The inventive concept here is to utilize a non-polluting source of energy to generate electric current.

The windmill 27 drives a compressor 35 which supplies air under a predetermined pressure to the supply chamber 49 of tank 50 and pressurized air from said supply chamber moves through an air line 52 to an operating tank 16 having a tubular shaft 62 mounted therein in communication with said air line 52 and having journaled thereon a wheel 65. Said tubular shaft 62 through its opening 75 will supply air through the hollow or tubular spokes of the wheel 65 as the belt 87 carries the inflatable air cells 90 about or over the lower run portion of the wheel. The belt 87 and the air cells 90 thereon are in register with the wheel 65 so that at the lower run of the wheel the flap opening 100 of each a cell will be in register with the air passage running from a spoke of the wheel. As viewed in FIG. 4 during the time that an air cell moves through a sector of the lower run of the wheel, pressurized air flows through the passage 92 to inflate the entire air cell. It is understood that with the water level in the tank at substantially the height of the upper shaft 80 that the water pressure will retain the air in each air cell as it becomes filled with air and the buoyancy of each filled air cell will cause the air cell to rise to the surface of the water thus driving the endless belt and in turn driving the shaft 80 which is in driving connection with the generator 18 and by conventional gear arrangement as well known in the art there will be a sufficient gearing differential to operate said generator to develop an output of electric current through the line 147.

As the air cells rise above the water level in the tank 56, the air retained in each air cell by the presence of the water will discharge from the air cell into the upper portion of said tank leaving the air cell in a deflated condition. The air passing from said air cells will pass through the air line 110 and through valve 117 and through the air line 116 into the reserve supply tank or reservoir 51.

The air received into the supply chamber 49 is intended to be retained at a certain predetermined operating level of pressure. During periods of substantial wind velocity there will be a greater supply of air passing into the chamber 49 than is required for a steady operation of the belt 87 and as determined by the regulator valve 54 and thus the pressure of air in said supply chamber 49 will rise and air will be bled off through the line 126 to be passed into the reservoir 51. The size of the reservoir 51 will depend upon the design requirements of the apparatus. When the air supply in the chamber 49 falls below an operating pressure such as at times when movement of air abates, air will move into said supply chamber 49 from the reservoir 51. The reservoir is designed to provide for a steady operation of the apparatus during such times as the prevailing winds are not sufficient to provide an operating quantity of air by means of the windmill 27.

The apparatus is made of known component parts and the inventive concept is embodied in the arrangement of the apparatus to utilize wind power together with a reserve supply of pressurized air to generate electric current.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A wind operated electric power generating apparatus having in combination
    a windmill,
    an air compressor operated by said windmill,
    a tank,
    a pair of vertically aligned spaced shafts mounted in said tank,
    the lower of said shafts having a passage therein,
    an air line running from said compressor to said shaft, a lower wheel journaled on said lower of said shafts having a plurality of spokes therein,
    each of spokes having an air passage therethrough outwardly of said wheel,
    said shaft having an opening therein providing communication with said air passages in said shafts when said wheel moves through its lower run about said shaft,
    an upper wheel mounted on the upper of said shafts, an endless belt passing over said wheels, a plurality of collapsible air cells secured to said belt, said air cells having closed upper end portions and open lower end portions through the upper run of said belt, said air cells being mounted upon said belt having inlets therein in registration with an air passage of one of said spokes of said lower wheel as said air cells pass through the lower run of said belt to have air pass into said air cells to inflate the same, a liquid filling said tank to a level adjacent said upper shaft, whereby said liquid retains air in said cells to hold said cells in inflated condition as said cells rise in said liquid driving said belt and said upper wheel, an electric current generator, and said upper shaft driven by said upper wheel having driving engagement with said generator.

2. The structure set forth in claim 1, including a chamber in said tank above said liquid level, said belt carrying said air cells through said chamber, means receiving and storing air discharged by said air cells in passing through said chamber.

3. The structure set forth in claim 1, including an air supply chamber, means passing air from said air compressor to said supply chamber, and means regulating the passage of air from said supply chamber to the air passage of said first mentioned shaft.

4. The structure set forth in claim 1 wherein each of said air cells comprises an air passage therein having a closed end portion adjacent the open end of said air cell and having an open end portion adjacent the closed end of said air cell, said inlet into said air cell being adjacent and in communication with the closed end portion of said passage, whereby air flows through said air passage to inflate said air cell from its closed end and moving in the direction of its open end.

5. An electric power generating apparatus having in combination a natural power source, an air compressor operated by said power source, a tank, a pair of vertically aligned spaced shafts mounted in said tank, the lower of said shafts having a passage therein, an air line running from said compressor to said shaft, a lower wheel journaled on said lower of said shafts having a plurality of spokes therein, each of spokes having an air passage therethrough outwardly of said wheel, said shaft having an opening therein providing communication with said air passages in said shafts when said wheel moves through its lower run about said shaft, an upper wheel mounted on the upper of said shafts, an endless belt passing over said wheels, a plurality of collapsible air cells secured to said belt, said air cells having closed upper end portions and open lower end portions through the upper run of said belt, said air cells being mounted upon said belt having inlets therein in registration with an air passage of one of said spokes of said lower wheel as said air cells pass through the lower run of said belt to have air pass into said air cells to inflate the same, a liquid filling said tank to a level adjacent said upper shaft, whereby said liquid retains air in said cells to hold said cells in inflated condition as said cells rise in said liquid driving said belt and said upper wheel, an electric current generator, and said upper shaft driven by said upper wheel having driving engagement with said generator.

* * * * *